(12) United States Patent
Chung et al.

(10) Patent No.: US 7,928,612 B2
(45) Date of Patent: Apr. 19, 2011

(54) LOW-NOISE, HIGH-SPEED, HIGH PRECISION AND HIGH-THRUST FLUX REVERSAL MOTOR FOR LINEAR OR ROTARY MOTION SYSTEM

(75) Inventors: Shi Uk Chung, Changwon-si (KR); Do Hyun Kang, Changwon-si (KR); Jung Hwan Chang, Changwon-si (KR); Ji Won Kim, Busan (KR); Ji Young Lee, Changwon-si (KR)

(73) Assignee: Korea Electrotechnology Research Institute, Gyeongsangnam-do (KR)

( * ) Notice: Subject to any disclaimer, the term of this patent is extended or adjusted under 35 U.S.C. 154(b) by 259 days.

(21) Appl. No.: 12/146,752

(22) Filed: Jun. 26, 2008

(65) Prior Publication Data
US 2009/0009010 A1    Jan. 8, 2009

(30) Foreign Application Priority Data

Jul. 5, 2007 (KR) .................. 10-2007-0067566
May 19, 2008 (KR) .................. 10-2008-0046284

(51) Int. Cl.
*H02K 41/00* (2006.01)
(52) U.S. Cl. ................ 310/12.24; 310/49.36; 310/49.46
(58) Field of Classification Search .... 310/12.24–12.26, 310/181, 49.03, 49.04, 49.28, 49.36, 49.46
See application file for complete search history.

(56) References Cited

U.S. PATENT DOCUMENTS

| 4,713,570 | A | * | 12/1987 | Mastromattei | 310/181 |
| 4,827,164 | A | * | 5/1989 | Horber | 310/49.37 |
| 5,218,250 | A | * | 6/1993 | Nakagawa | 310/12.21 |

* cited by examiner

*Primary Examiner* — Dang D Le
(74) *Attorney, Agent, or Firm* — The Webb Law Firm

(57) ABSTRACT

Disclosed herein is to a flux reversal motor. The flux reversal motor includes a mover, and a plurality of permanent magnets. The mover moves linearly relative to a stator. A plurality of permanent magnets, having identical polarities, is provided in the end of each mover tooth. The permanent magnets are arranged on the left and right sides of a protrusion of the end of the mover tooth. Thus low noise/low vibration, high speeds, high precision, and high thrust motion can be realized.

19 Claims, 22 Drawing Sheets

LOW-NOISE, HIGH-SPEED, HIGH PRECISION AND HIGH-THRUST FLUX REVERSAL MOTOR FOR LINEAR OR ROTARY MOTION SYSTEM

BACKGROUND OF THE INVENTION

1. Field of the Invention

The present invention relates generally to a flux reversal motor and, more particularly, to a linear motor, which can decrease the number of permanent magnets that are used, can facilitate magnetization using permanent magnets having the same polarities, can move at high speed because thrust is increased, and can realize low noise/low vibration and high precision position control by decreasing the pulsation of thrust and normal force, and to a rotary motor, which is based on the concept of the linear motor, and which can prevent the degradation of the permanent magnets from occurring because the permanent magnets are provided in a rotor, can prevent scattering from occurring because the permanent magnets are provided in a stator, and can be effectively manufactured by applying divided iron cores to a stator or rotor.

2. Description of the Related Art

A conventional linear motor representatively includes a permanent magnet linear synchronous motor, and is widely used for the purpose of attaining high speeds, rapid acceleration and deceleration, and high precision position control. However, a conventional permanent magnet linear synchronous motor is formed to have an actuation coil structure, in which permanent magnets are located in a stator, so that it has disadvantages in that the manufacturing cost thereof is inevitably increased because the movement distance is increased and, thus, the number of permanent magnets that are used is increased, and in that the pulsation of thrust and normal force are caused due to the end-effect, which occurs at the ends of the entry and exit of a mover. Furthermore, some applications of the conventional permanent magnet linear synchronous motor may be limited by the influence of the leakage magnetic flux, which is generated by the permanent magnets attached to the stator, on the surroundings.

SUMMARY OF THE INVENTION

Accordingly, the present invention has been made keeping in mind the above problems occurring in the prior art, and the present invention is directed to provide a flux reversal linear motor, which can reduce the manufacturing cost thereof because the number of permanent magnets that are used is decreased, which can facilitate magnetization by enabling movable permanent magnets, having the same polarities, to be provided in a mover, which can decrease the pulsation of thrust and normal force by preventing an end-effect, such as the generation of leakage magnetic flux, from occurring through the appropriate arrangement of the movable permanent magnets, and which can also decrease detent force by applying a predetermined skew structure to a mover or stator core, thus realizing low noise/low vibration, high speeds, high precision, and high thrust motion.

Furthermore, the present invention aims to provide a flux reversal linear motor, which enables the mover or stator teeth of the flux reversal linear motor to be modified and implemented in various ways in order to meet various demands for application systems, and which, if necessary, enables an odd number of permanent magnets to be used at the locations of the central protrusion of each mover tooth, or enables the permanent magnets to be arranged in the stator or mover teeth.

Furthermore, the present invention is directed to provide a flux reversal rotary motor, which is based on the concept of the linear motor, and which can decrease the number of permanent magnets that are used, can facilitate magnetization, can increase the torque, can decrease the pulsation of the torque, can prevent the degradation of permanent magnets, attributable to the heat that is generated by stator coils, from occurring because the permanent magnets are provided in the rotor, can prevent scattering from occurring because the permanents magnets are provided in the stator, and can be economically and easily manufactured by applying divided iron cores to the stator or rotor.

Furthermore, the present invention is directed to provide a flux reversal rotary motor, which enables the mover teeth or stator teeth of the flux reversal rotary motor to be modified and implemented in various ways in order to meet various demands for application systems, and which, if necessary, enables portions, to which the permanent magnets are attached, to be selectively replaced with iron core teeth, thus decreasing the number of permanent magnets that are used, or enables an odd number of three or more permanent magnets to be arranged in the opposite stator or rotor, on which a plurality of protrusions are formed.

First, the features of the present invention are summarized. In order to accomplish the above object, the present invention provides a flux reversal motor, including: a mover moving linearly relative to a stator; and a plurality of permanent magnets, having identical polarities, provided in the end of each mover tooth, the permanent magnets being arranged on the left and right sides of a protrusion of the end of the mover tooth.

The permanent magnets may be configured to have any of triangular, rectangular, square, trapezoidal, pentagonal, and circular shapes. When the permanent magnets are configured to have any of the triangular, rectangular, square, trapezoidal, pentagonal, and circular shapes, at least one edge of each of the permanent magnets may be formed to have a round shape. The end of the protrusion may be configured to have any of rectilinear, round, angled, and chamfered shapes. The ends of teeth of the stator may be configured to have any of rectilinear, round, angled, and chamfered shapes.

The permanent magnets may be configured in such a way that, when other elements of the mover are completed, predetermined magnets are attached to predetermined locations and are then magnetized.

The iron cores of the stator or of the mover may be laminated such that the stator teeth and the mover teeth are opposite each other so as to have a predetermined skew structure.

The stator may have a curved track for the motion of the mover.

The mover may include mover teeth, the number of which is a multiple of three, which are arranged at an identical pitch in a motion direction. The ends of the mover teeth may have a length three or any odd number of times as great as the pole pitch of each of the permanent magnets in the motion direction.

In addition, the present invention provides a flux reversal motor, including: a mover moving linearly relative to a stator; and a plurality of permanent magnets, having identical polarities, provided in the end of the stator at respective locations between the teeth of the stator, which repeat in a motion direction. The mover has an uneven surface structure in which, in the end of each tooth thereof, two protrusions are formed in the end of each tooth and one depression is formed between the two protrusions.

In addition, the present invention provides a flux reversal motor, including: a mover moving linearly relative to a stator;

and an odd number of permanent magnets, including: a plurality of first permanent magnets, having identical polarities, provided at the left and right edges of the end of each mover tooth; and at least one second permanent magnet, having a polarity opposite to those of the first permanent magnets, provided between the first permanent magnets.

In addition, the present invention provides a flux reversal motor, including: a rotor rotating internally or externally relative to a stator in a circumferential direction; and a plurality of permanent magnets, having identical polarities, provided in the end of each stator tooth, the permanent magnets being arranged on the left and right sides of at least one protrusion, or arranged at respective locations between a plurality of protrusions of the end of the stator tooth. The stator may include stator teeth, the number of which is a multiple of three, which are arranged at an identical pitch in the circumferential direction. The stator or rotor has a laminated iron core, the laminated iron core being formed by coupling two or more divided iron cores to each other. The flux reversal motor may be used to drive the wheel of a vehicle.

The vehicle includes all of an automobile, an electric rail car, a train and like, which have drive equipment using wheels.

In addition, the present invention provides a flux reversal motor, including: a rotor rotating internally or externally relative to a stator in a circumferential direction, and a plurality of permanent magnets, having identical polarities, provided in the end of the rotor at respective locations between teeth, which repeat in the circumferential direction.

In addition, the present invention provides a flux reversal motor, including: a rotor rotating internally or externally relative to a stator in a circumferential direction; and an odd number of permanent magnets, comprising: a plurality of first permanent magnets, having identical polarities, provided at the left and right edges of the end of each stator tooth; and at least one second permanent magnet, having a polarity opposite to those of the first permanent magnets, provided between the first permanent magnets.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
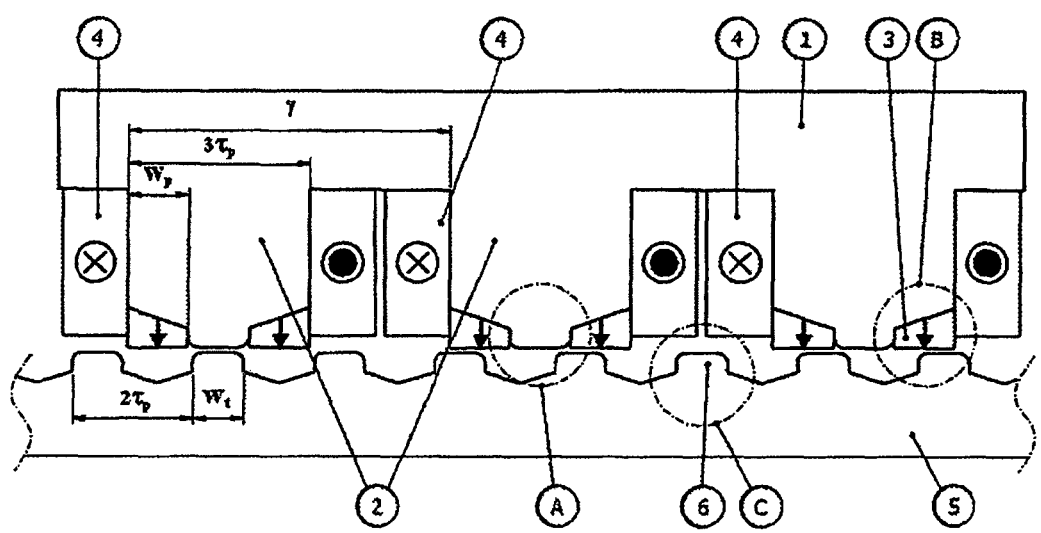
FIG. 1 is a view illustrating the mover and stator of a linear motor according to an embodiment of the present invention.

Preferred embodiments of the present invention are described in detail below with reference to the accompanying drawings and details described in the accompanying drawings, but the present invention is not limited to the embodiment, and is not to be defined by the embodiments. The same reference numerals, which are used throughout the different drawings, designate the same or similar components.

FIG. 1 is a view illustrating the mover and stator of a linear motor according to an embodiment of the present invention. Referring to FIG. 1, the mover of the linear motor according to the embodiment of the present invention includes a mover core 1, mover teeth 2, permanent magnets 3, and mover phase coils 4. The stator of the linear motor according to the embodiment of the present invention includes a stator core 5 and stator teeth 6.

When an appropriate amount of current is applied to the mover phase coils 4, which are formed by winding the coil around the mover teeth 2, as shown in FIG. 1 (X: inward direction, ⊙: outward direction), the flow of magnetic flux that is generated by the permanent magnets 3 varies according to variation in the relative locations between the mover and the stator, and thus the thrust is generated. Accordingly, the mover, which is a linearly moving body, moves linearly relative to the stator.

In particular, in the present invention, the permanent magnets 3, having the same polarities, are provided in the end of each mover tooth 2, as shown in FIG. 1. In greater detail, the permanent magnets 3 are arranged on the left and right sides of the central protrusion A of the end of the mover tooth. In this case, in order to generate the thrust using three-phase back-electromotive force, which is caused by the mover phase coils 4, the mover includes mover teeth 2, the number of which is a multiple of three, which are arranged at the same pitch in the motion direction. In this case, the mover teeth 2 are arranged at the pitch γ. This means that the mover teeth 2 are arranged at intervals of 120 degrees, so that the back-electromotive force, which is necessary for linear motion, can be appropriately generated due to the moving effect of the permanent magnets 3. The width Wp of each permanent magnet 3 and the width Wt of each stator tooth 6 may be designed to be smaller or greater than the pole pitch $\tau_p$ of each permanent magnet 3, which is the width of each central protrusion (A). For example, the end of each mover tooth 2 may be designed to be three time as great as the pole pitch of each permanent magnet 3 in the motion direction by arranging the stator teeth 6 at a pitch of $2\tau_p$ and setting the width Wp of each permanent magnet 3 and the width Wt of each stator tooth 6 to $\tau_p$. In addition, in various modifications, described below with reference to FIG. 5, the end of each mover tooth 2 may be extended to have a necessary dimension, for example, to be other odd number times such as five times, seven times, . . . as great as the pole pitch $\tau_p$ of the permanent magnets 3, in the motion direction.

Figure 2:
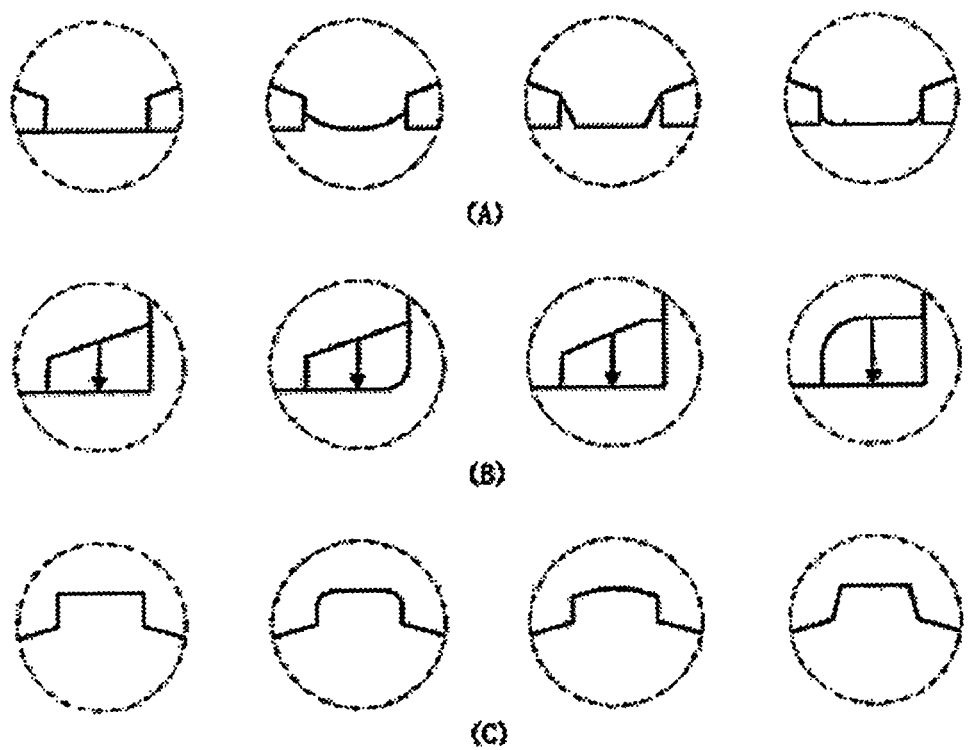
FIG. 2 is a view illustrating various embodiments of (A) the central protrusions of mover teeth, (B) permanent magnets, and (C) stator teeth.

FIG. 2 is a view illustrating various embodiments of (A) the central protrusions of mover teeth 2, (B) permanent magnets, and (C) stator teeth. As shown in FIG. 2, the end of a central protrusion (A), which is located between two permanent magnets 3, may be configured to have any of various shapes, such as a rectilinear shape, a round shape, an angled shape or a chamfered shape. Furthermore, the permanent magnets 3 may have a rectangular, regular triangular, trapezoidal or pentagonal shape. In addition, the permanent magnets 3 may have a triangular shape or a circular shape. In the case where the permanent magnets 3 have an angled shape, such as a triangular, rectangular, regular triangular, trapezoidal or pentagonal shape, at least one edge of each of the permanent magnets 3 may be formed to have a round shape, as shown in FIG. 2. The ends of the stator teeth 6 (C) may also be configured to have any of various shapes, such as a rectilinear shape, a round shape, an angled shape, and a chamfered shape, as shown in FIG. 2.

In the linear motor according to the present invention, constructed as described above, the movable permanent magnets 3 are provided in the mover, so that the number of permanent magnets that are used is decreased compared to when a number of permanent magnets proportional to the movement distance is provided in the existing stator permanent magnet, by which the manufacturing cost can be reduced.

Furthermore, when the movable permanent magnets 3, the mover teeth 2, and the stator teeth 6 are formed to have predetermined shapes and are appropriately arranged as described above, the sharp variation in reluctance is controlled and the leakage magnetic flux is reduced, and the end-effect is eliminated, so that the pulsation of the thrust and the normal force can be decreased.

Figure 3:
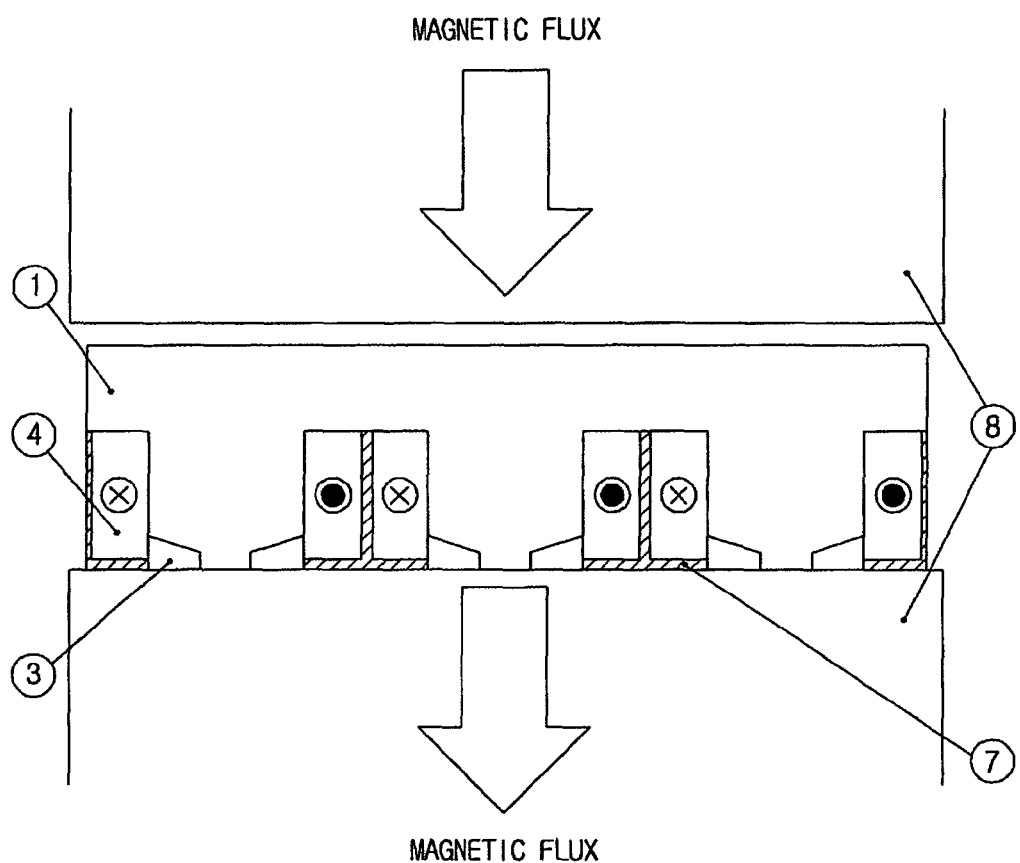
FIG. 3 is a conceptual diagram illustrating the permanent magnet magnetization of the mover.

Furthermore, in the present invention, as shown in FIG. 1, magnetization can be easily realized because the permanent magnets 3 having the same polarities are used in the mover. That is, in the present invention, there is no difficulty in manufacturing, unlike the existing method in which the attachment of permanent magnets, which are separately magnetized and have polarities different from each other, are individually conducted. Accordingly, in the present invention, as shown in FIG. 3, the permanent magnets 3 can be easily magnetized in such a way that the mover core 1, permanent magnets 3, which are not magnetized, and the mover phase coils 4 are securely assembled to each other through encapsulation using encapsulation resin 7, and then magnetization is performed on the permanent magnets 3, which are not magnetized, using a predetermined magnetization yoke 8.

Figure 4:
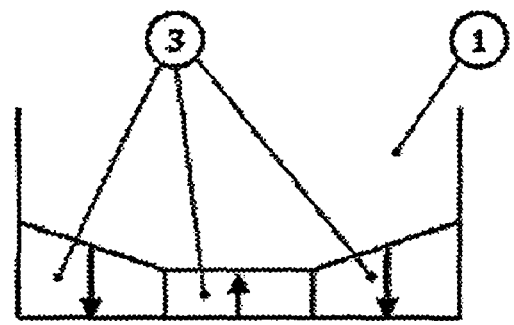
FIG. 4 is a view illustrating the case in which three permanent magnets are applied to the mover.
Figure 5:
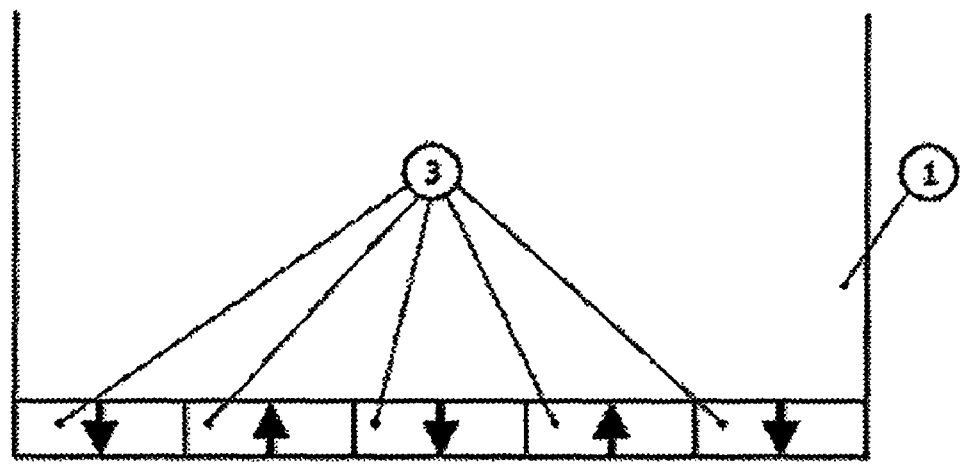
FIG. 5 is a view illustrating the case in which five permanent magnets are applied to the mover.

As shown in FIG. 4, the respective permanent magnets 3, which are arranged at the left and right edges of the end of each mover tooth 2, and a single permanent magnet, having a polarity opposite to those of the permanent magnets 3, may be used together at the location of each central protrusion (A), described with reference to FIG. 1. Furthermore, as shown in FIG. 5, the respective permanent magnets 3, which are arranged at the left and right edges of the end of each mover tooth 2, and three permanent magnets, which includes two permanent magnets having polarities opposite to those of the permanent magnets 3, may be used together at the location of each central protrusion (A). For example, in FIG. 4, the permanent magnets, which are attached to the end of each mover tooth 2, may have polarities of N-S-N or S-N-S. Furthermore, in FIG. 5, the permanent magnets, which are attached to the end of each mover tooth 2, may have polarities of N-S-N-S-N or S-N-S-N-S. That is, instead of each central protrusion (A), an odd number of permanent magnets, which include first permanent magnets, which are provided at both edges of the end of each mover tooth 2, and at least one second permanent magnet having a polarity opposite to those of the first permanents, are used. In this case, a stronger thrust is ensured, and thus applicability to high-speed application systems can be realized.

Figure 6:
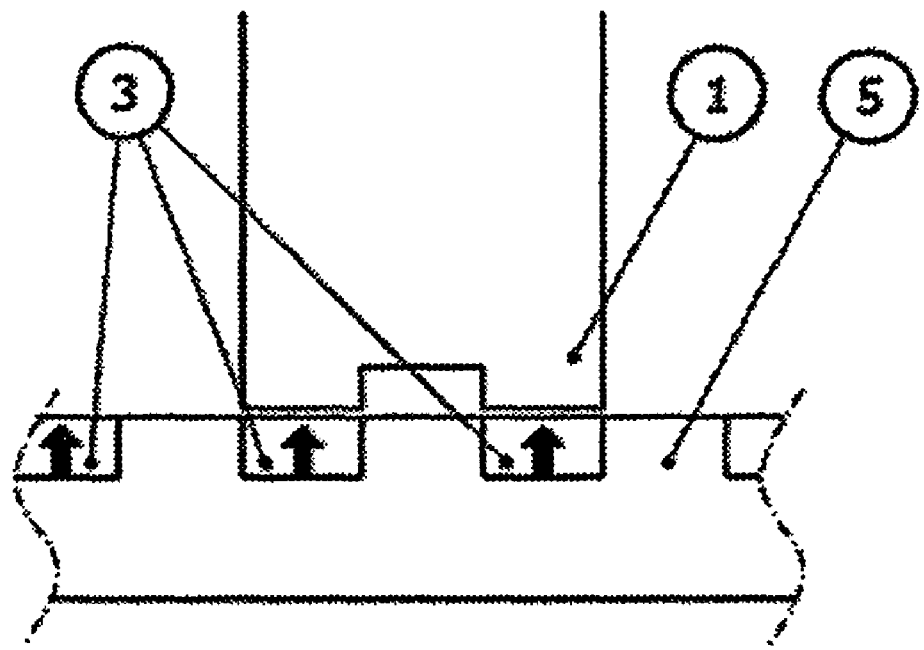
FIG. 6 is a view illustrating a first example of using permanent magnets in a stator and forming a mover to have a prominence and depression structure.
Figure 7:
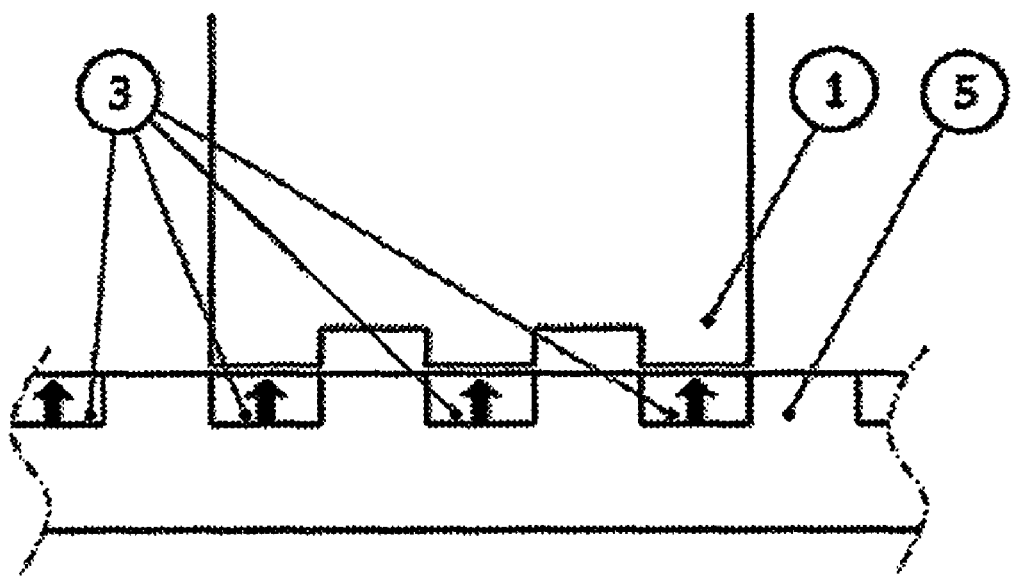
FIG. 7 is a view illustrating a second example of using permanent magnets in a stator and forming a mover to have a prominence and depression structure.

Meanwhile, in order to prevent the degradation of the characteristics of the permanent magnets 3 from occurring due to the heat generated by the mover phase coils 4, if necessary, permanent magnets may be arranged in the stator, as shown in FIGS. 6 and 7.

FIG. 6 is a view illustrating a first example of using permanent magnets in a stator and forming a mover to have a prominence and depression structure. As shown in FIG. 6, the configuration may be made such that a plurality of permanent magnets, having the same polarities, are provided in the end of the stator at respective locations between the teeth 6 of the stator core 5, which repeat in the motion direction. In this case, the mover may have an uneven surface structure in which, in the end of each tooth of the mover core 1, two protrusions are formed in the end of each tooth, and one depression is formed between the two protrusions.

FIG. 7 is a view illustrating a second example of using permanent magnets in a stator and forming a mover to have a prominence and depression structure. As shown in FIG. 7, the configuration may be made such that a plurality of permanent magnets, having the same polarities, are provided in the end of the stator at respective locations between the teeth 5 of the stator core 5, which repeat in the motion direction. In this case, the mover may have an uneven surface structure in which, in the end of each tooth of the mover core 1, three protrusions are formed in the end of each tooth, and depressions are formed between the three protrusions. Furthermore, the mover may have an uneven surface structure in which three or more protrusions are provided, and depressions are formed between the three or more protrusions.

As described above, in the flux reversal linear motor according to the present invention, an odd number of permanent magnets can be provided at the location of the central protrusion (A) of each mover tooth 2, and the permanent magnets can be arranged in the stator as well as in the mover. In addition, the mover teeth 2 or the stator teeth 6 can be modified and implemented in various ways to conform to requirements for various application systems.

Figure 8:
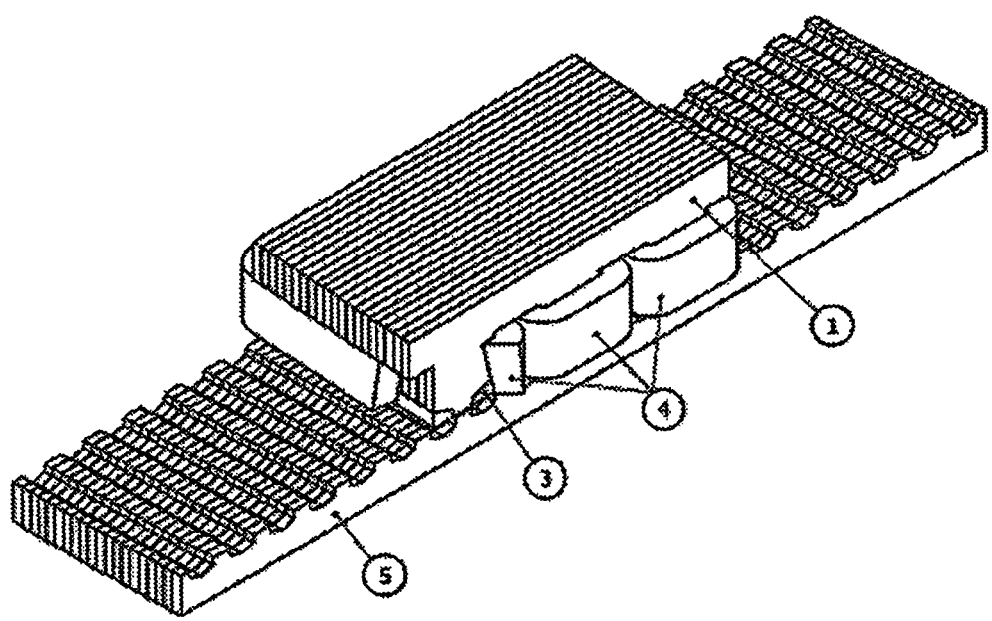
FIG. 8 is a perspective view of the linear motor according to the embodiment of the present invention.

The overall perspective view of the linear motor, which is implemented in various ways, is shown in FIG. 8. When an appropriate amount of power, such as three-phase current, is supplied to the mover phase coils 4, the mover receives thrust in response to the operation of the mover core 1 and the permanent magnets 3, which are opposite the stator core 5, and then moves linearly along the path of the stator.

Figure 9:
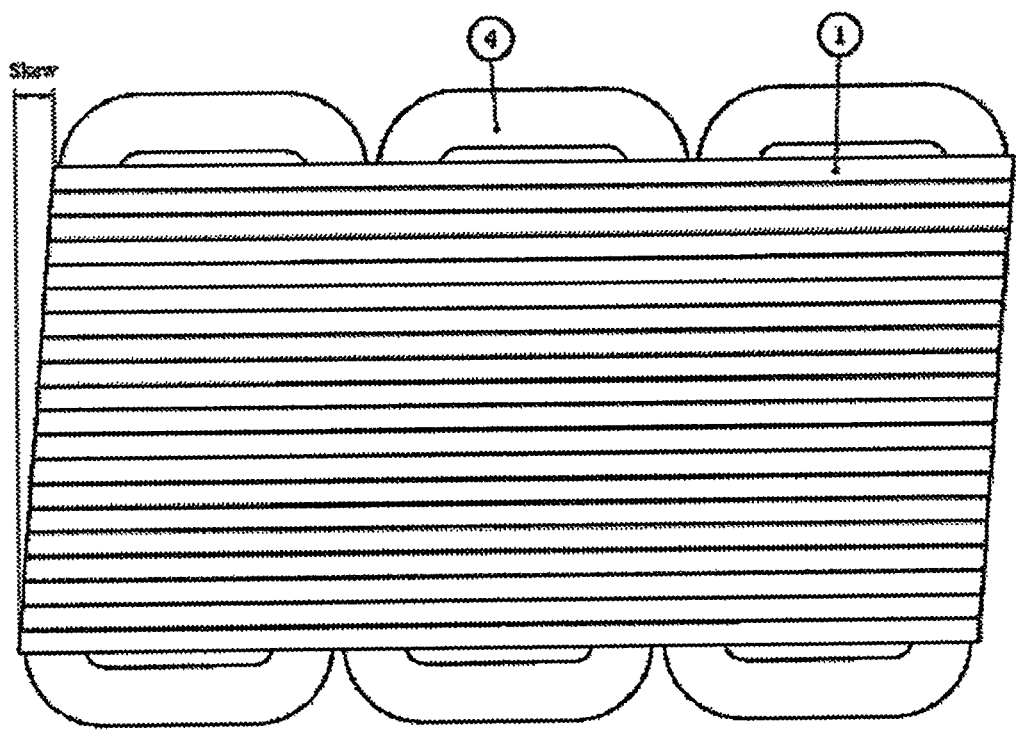
FIG. 9 is a view showing the structure of the linear motor according to the embodiment of the present invention, in which a skew structure is applied to a mover core.

In this case, in order to further decrease the pulsation attributable to the detent force and the end-effect, stator or mover cores may be laminated such that the mover teeth 2 and the stator teeth 6 are opposite each other so as to have a predetermined skew structure, as shown in FIG. 9. In FIG. 9, the skew length corresponds to the period of the detent force. The period of the detent force may vary according to the pitch of each of the teeth 2/6. When the skew structure is applied as described above, applicability to various application systems for which low noise/low vibration, high speeds, high precision, and high thrust are required can be realized.

Figure 10:
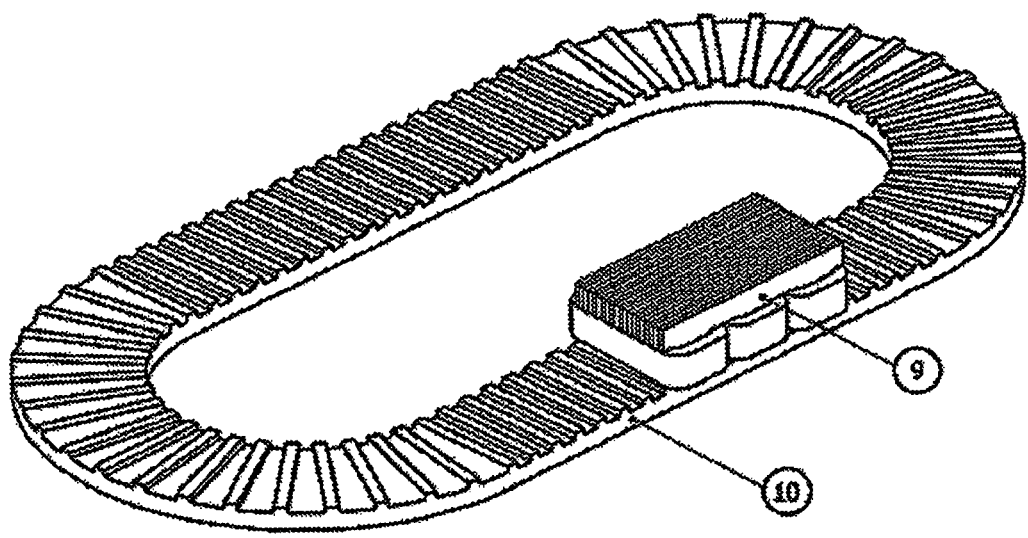
FIG. 10 is a perspective view showing an example of a linear motor, which is implemented using a stator having a curved portion, according to an embodiment of the present invention.

FIG. 10 is a perspective view showing an example of a linear motor, which is implemented using a stator having a curved portion, according to an embodiment of the present invention. The structure of the mover and the stator according to the present invention can be applied when the stator for the motion of the mover is configured to have a curved track, as shown in FIG. 10.

Meanwhile, an example in which the structural concept of the above-described mover and stator is applied to a rotary flux reversal motor is described below.

Figure 11:
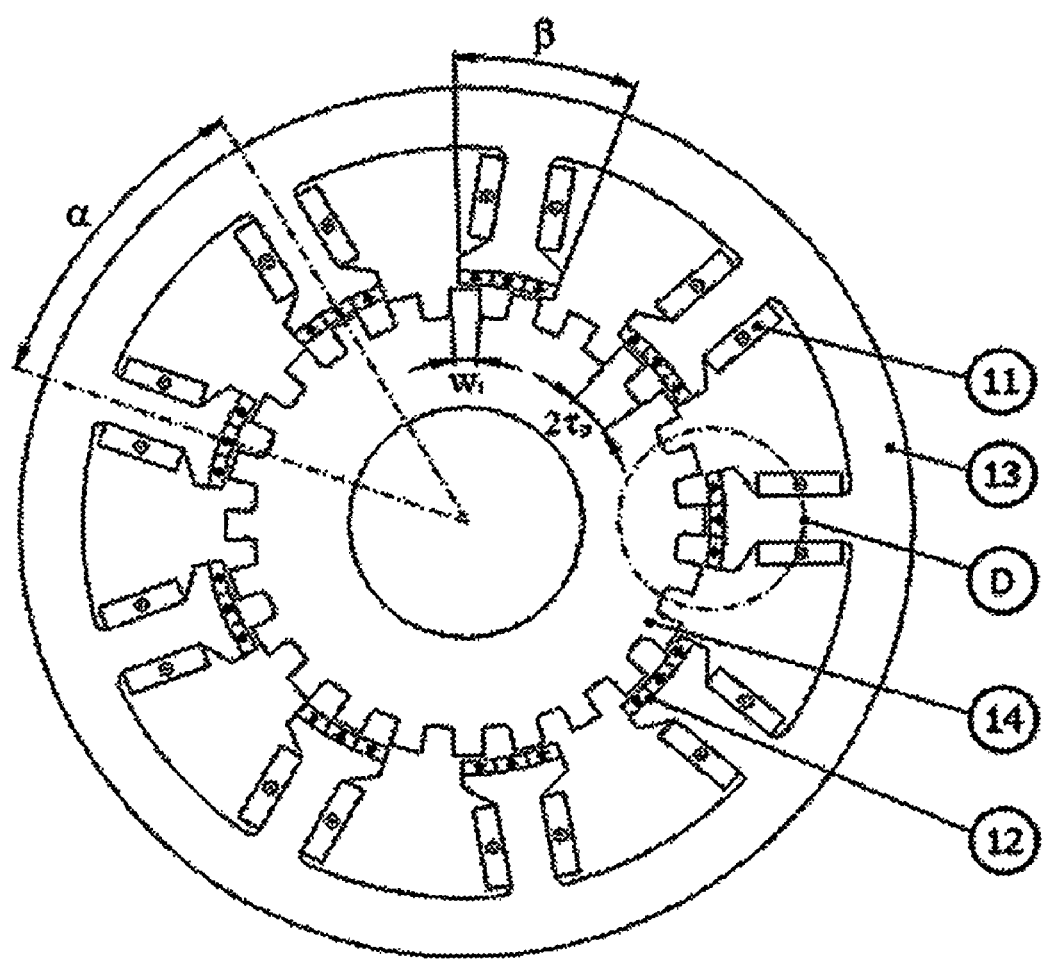
FIG. 11 is a view illustrating an inner rotor type motor, in which permanent magnets are located in a stator, according to an embodiment of the present invention.
Figure 12:
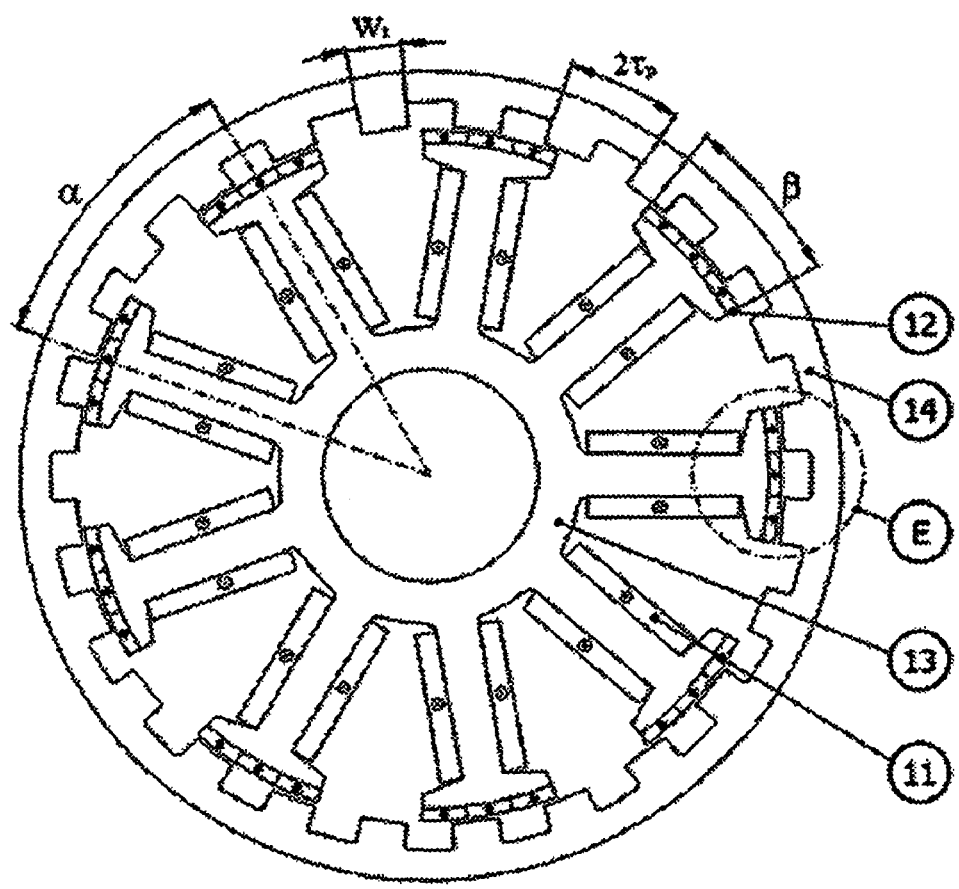
FIG. 12 is a view illustrating an outer rotor type motor, in which permanent magnets are located in a stator, according to an embodiment of the present invention.

FIG. 11 is a view illustrating an inner rotor type motor, in which permanent magnets 12 are located in a stator, according to an embodiment of the present invention. FIG. 12 is a view illustrating an outer rotor type motor, in which permanent magnets 12 are located in a stator, according to an embodiment of the present invention.

As shown in FIGS. 11 and 12, the stator of the rotary motor according to the present invention includes stator phase coils 11, a permanent magnet 12, and a stator core 13. The rotor of the rotary motor according to the present invention includes a rotor core 14. Teeth, which repeat in the circumferential direction, are provided in the end of the rotor core 14.

When an appropriate amount of three-phase current is applied to the stator phase coils 11, the rotor, which is the rotary moving body shown in FIG. 11, rotates internally relative to the stator in the circumferential direction, whereas the rotor, which is a rotary moving body shown in FIG. 12, rotates externally relative to the stator in the circumferential direction.

In particular, the structures of FIGS. 11 and 12 are based on the concepts of FIGS. 4 and 5. Each of the structures includes an odd number of permanent magnets, which includes first permanent magnets, having the same polarities, provided at the left and right edges of the end of each stator tooth (refer to D/E), and at least one second permanent magnet, having a polarity opposite to those of the first permanent magnets, arranged between the first permanent magnets. As shown in (D) and (E) of FIG. 15, the end of each stator tooth (refer to D/E) may be modified and implemented in various ways. For example, permanent magnets, having the same polarities, may be provided in the end of each stator tooth, and may be arranged on the left and right sides of a single protrusion of the end of the stator tooth (refer to the second drawings from the right side in D and E of FIG. 15), or a single permanent magnet may be provided between two protrusions (refer to the third drawings from the right side in D and E of FIG. 15). Furthermore, permanent magnets 12, having the same polarities, may be provided in the end of the rotor at respective locations between the teeth the end of the rotor, which repeat in the circumferential direction (refer to the rightmost drawings from the right side in D and E of FIG. 15).

Figure 13:
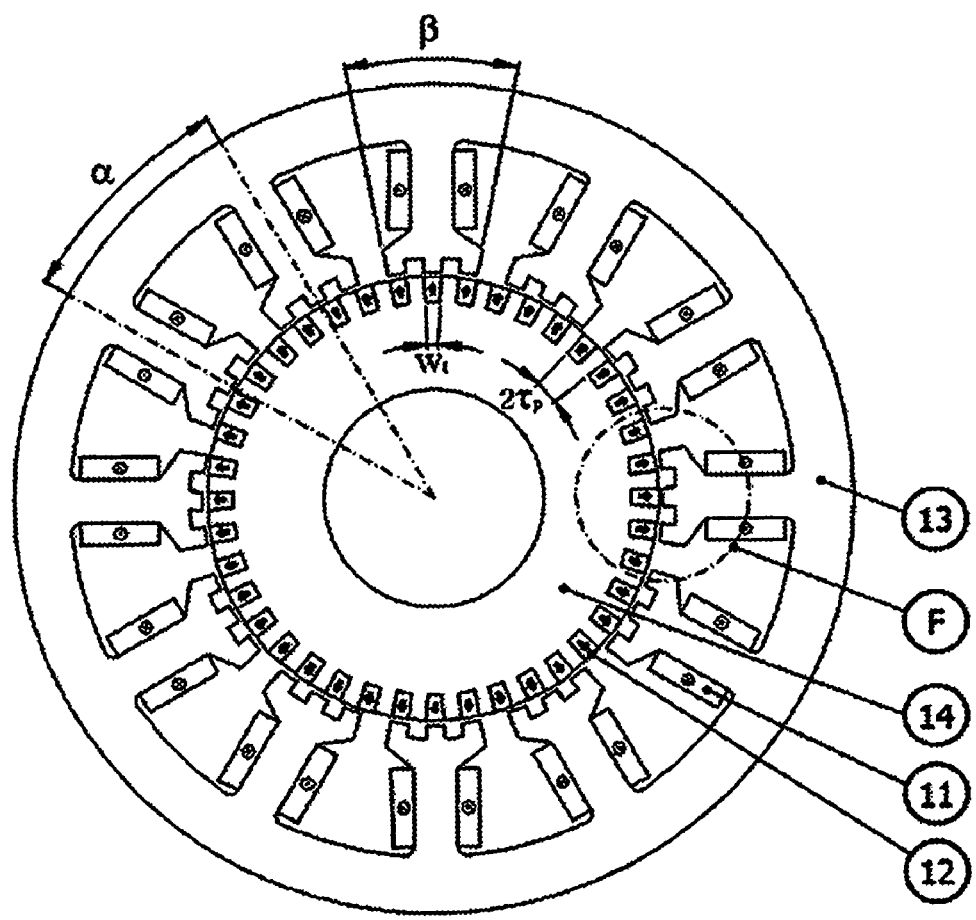
FIG. 13 is a view illustrating an inner rotor type motor, in which permanent magnets are located in a rotor, according to an embodiment of the present invention.
Figure 14:
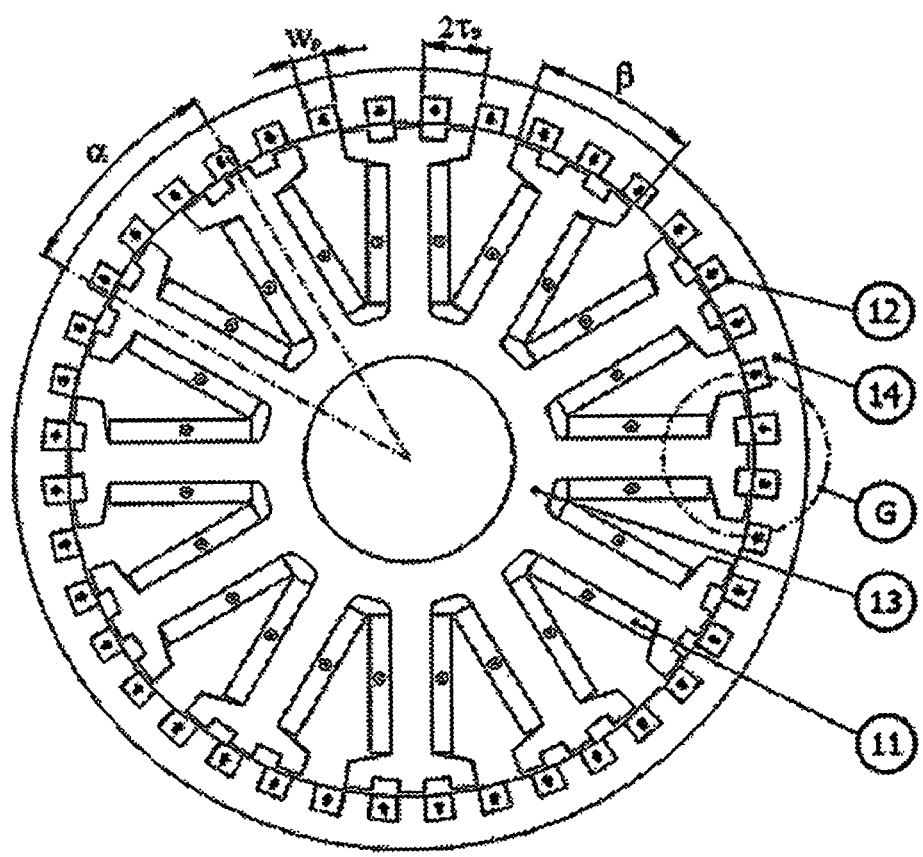
FIG. 14 is a view illustrating an outer rotor type motor, in which permanent magnets are located in a rotor, according to an embodiment of the present invention.

FIG. 13 is a view illustrating an inner rotor type motor, in which permanent magnets 12 are located in a rotor, according to an embodiment of the present invention. FIG. 14 is a view illustrating an outer rotor type motor, in which permanent magnets 12 are located in a rotor, according to an embodiment of the present invention.

FIGS. 13 and 14 show the structures in each of which permanent magnets 12 are arranged in the rotor. The structures are based on the concepts of FIGS. 6 and 7. The permanent magnets 12, having the same polarities, may be provided in the end of the rotor (refer to F/G) at respective locations between the teeth of the end of the rotor, which repeat in the circumferential direction. As shown in (F) and (G) of FIG. 15, the end of each stator tooth (refer to F/G) may be modified and implemented in various ways. For example, the permanent magnets 12, having the same polarities, may be provided in the end of each stator tooth and, in particular, may be arranged on the left and right sides of at least one protrusion of the end of the stator (refer to the second drawings from the right side in F and G of FIG. 15), or may be provided at respective locations between a plurality of protrusions (refer to the third drawings from the right side in F and G of FIG. 15).

Figure 15:
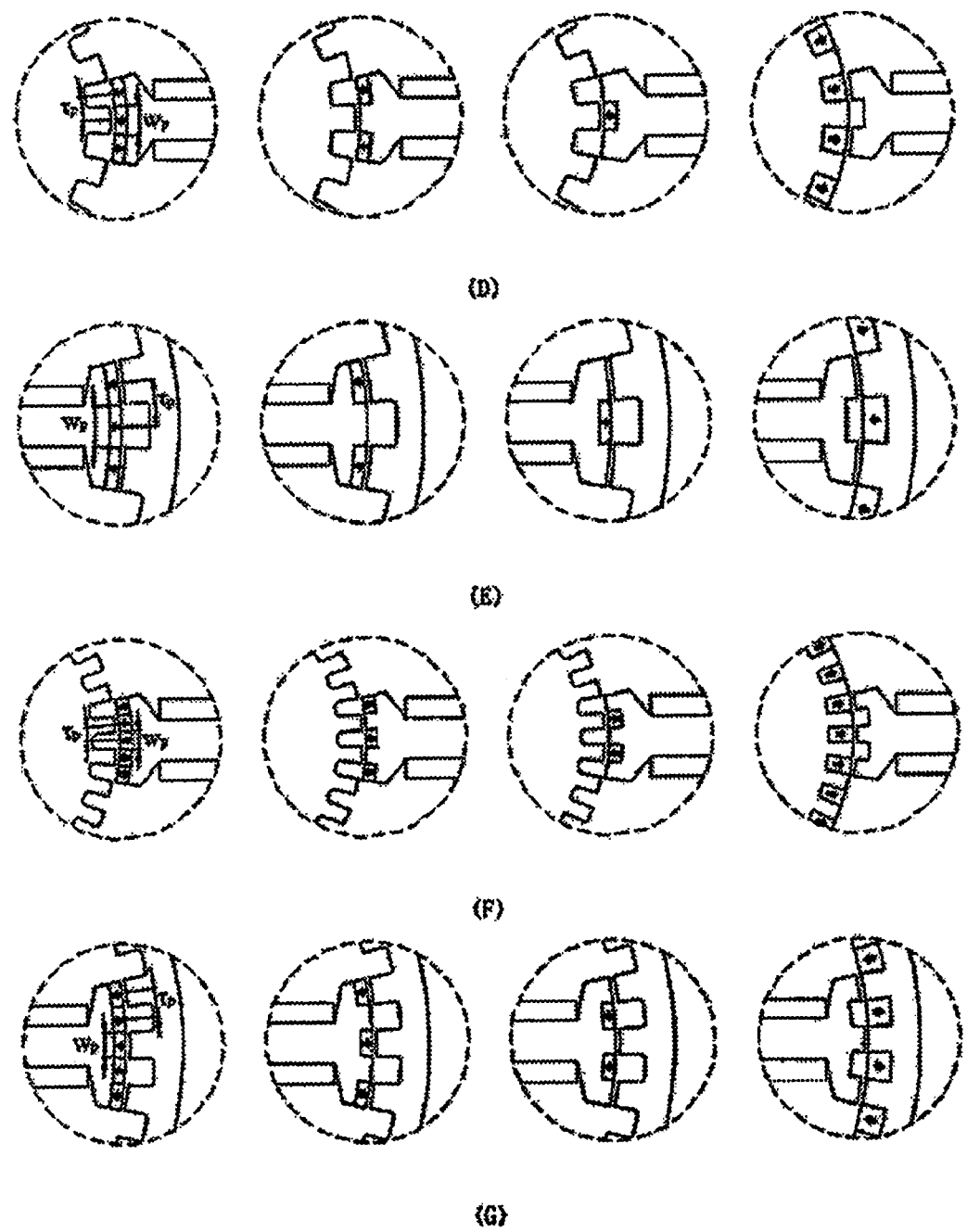
FIG. 15 is a view illustrating examples in which permanent magnets are applied, in various ways, to the stator or rotor of inner rotor type or outer rotor type motor according to the embodiment of the present invention.

Furthermore, as in the first drawings in (F) and (G) of FIG. 15, an odd number of permanent magnets, which includes first permanent magnets, having the same polarities, provided in the end of each stator tooth (refer to F/G) at the left and right edges of the end of the stator, and at least one permanent magnet, having a polarity opposite to those of the permanent magnets, provided at respective locations between the permanent magnets, for example, one or three permanent magnets, may be provided. In this case, teeth, which repeat and have a protruding shape, are formed in the end of the rotor.

In the above-described rotary motor, shown in FIGS. 11 to 14, in order to generate the torque using the three-phase back-electromotive force, which is caused by the rotor phase coils 11, the stator includes stator teeth, the number of which is a multiple of three, which are arranged at the same pitch in the rotary motion direction, that is, in the circumferential direction, regardless of the type thereof, that is, an inner rotor type or an outer rotor type. In this case, the end of each stator tooth may be implemented to have various lengths.

For example, FIGS. 11 and 12 show the case in which nine stator teeth (three stator teeth for each of three phases) are present in the stator, and the tooth angle β=3 $\tau_p$. In this case, the pole pitch $\tau_p$ of each permanent magnet 12=22.5/3=7.5 degrees, the tooth angle β=22.5 degrees, and the arrangement angle α=120/3=40 degrees. FIGS. 13 and 14 shows the case in which twelve stator teeth are present in the stator (four stator teeth for each of three phases), and the tooth angle β5 $\tau_p$. In this case, the pole pitch $\tau_p$ of each permanent magnet 12=18/4=4.5 degrees, tooth angle β=22.5 degrees, and arrangement angle α=120/4=30 degree.

Although the case where nine or twelve stator teeth are present in the stator, as shown in FIGS. 11 and 12, has been described above, the present invention is not limited thereto. Alternatively, the stator may be implemented in various ways to include stator teeth, the number of which is a multiple of 3. As described above, the teeth angle β and the arrangement angle α, which are described above, are integrally determined according to the number of stator teeth, and thus the stator teeth and the permanent magnets can be arranged at predetermined pitches.

In addition, the torque pulsation can be decreased by changing the width Wp of each permanent magnet 12, the width Wt of each rotor tooth, or the shape of the rotor, the stator or the permanent magnet 12.

In the present invention, when permanent magnets are included in the rotor as described above, the degradation of the permanent magnets, attributable to the heat that is generated by the stator phase coils 11, can be prevented from occurring. When permanent magnets are included in the stator as described above, the concern about scattering of the permanent magnets during operation can be alleviated. Furthermore, when portions to which permanent magnets are attached in the rotor or in the stator are selectively replaced with iron core teeth as shown in FIG. 15, the number of permanent magnets that are used can be reduced.

Meanwhile, the laminated iron core of the stator or rotor of the above-described rotary motor may be formed by coupling two or more divided iron cores to each other.

Figure 16:
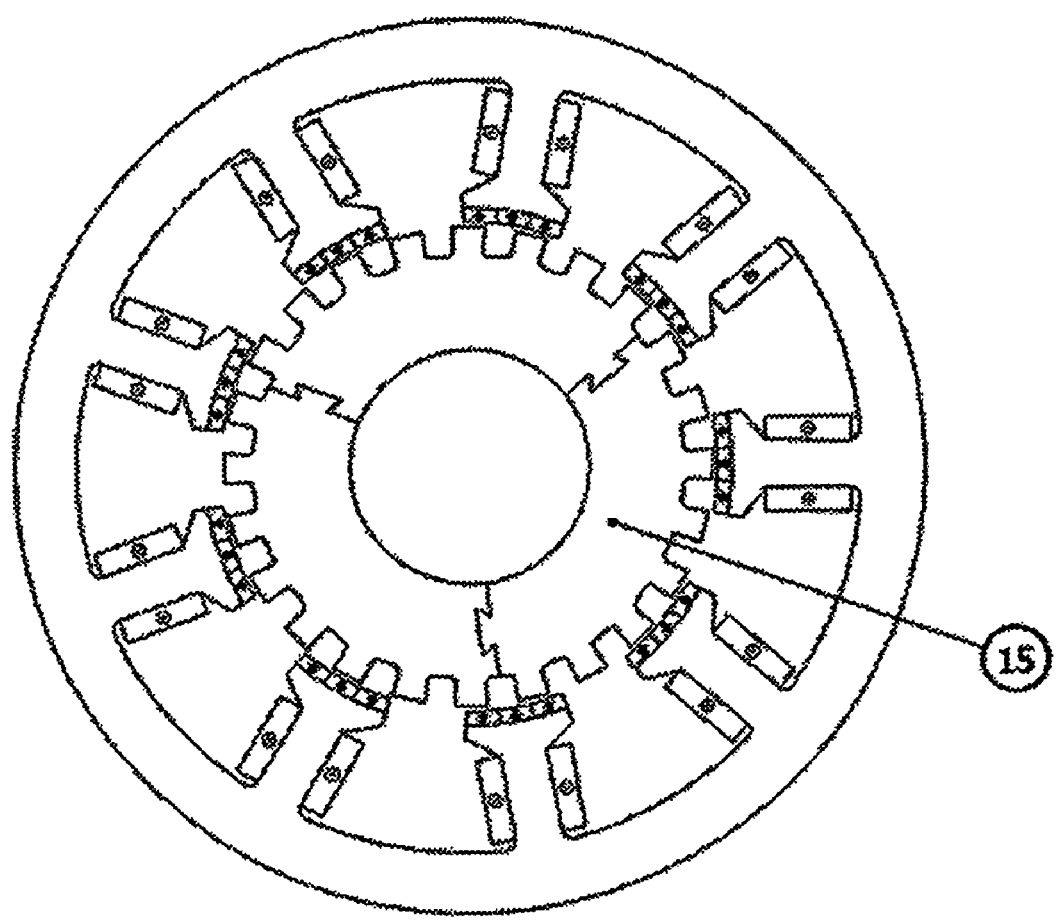
FIG. 16 is a view illustrating the case in which a triple-divided iron core is applied to the rotor of the inner rotor type motor according to the embodiment of the present invention.

The rotor of the inner rotor type motor, shown in FIG. 11, may be formed by coupling three divided iron cores, shown in FIG. 16, to each other. Each of the divided iron cores 15 of the rotor has a protrusion and a depression, and the protrusion of one divided iron core is coupled to the depression of another divided iron core, so that the divided iron cores can be securely coupled to each other even when rotary motion is performed.

Figure 17:
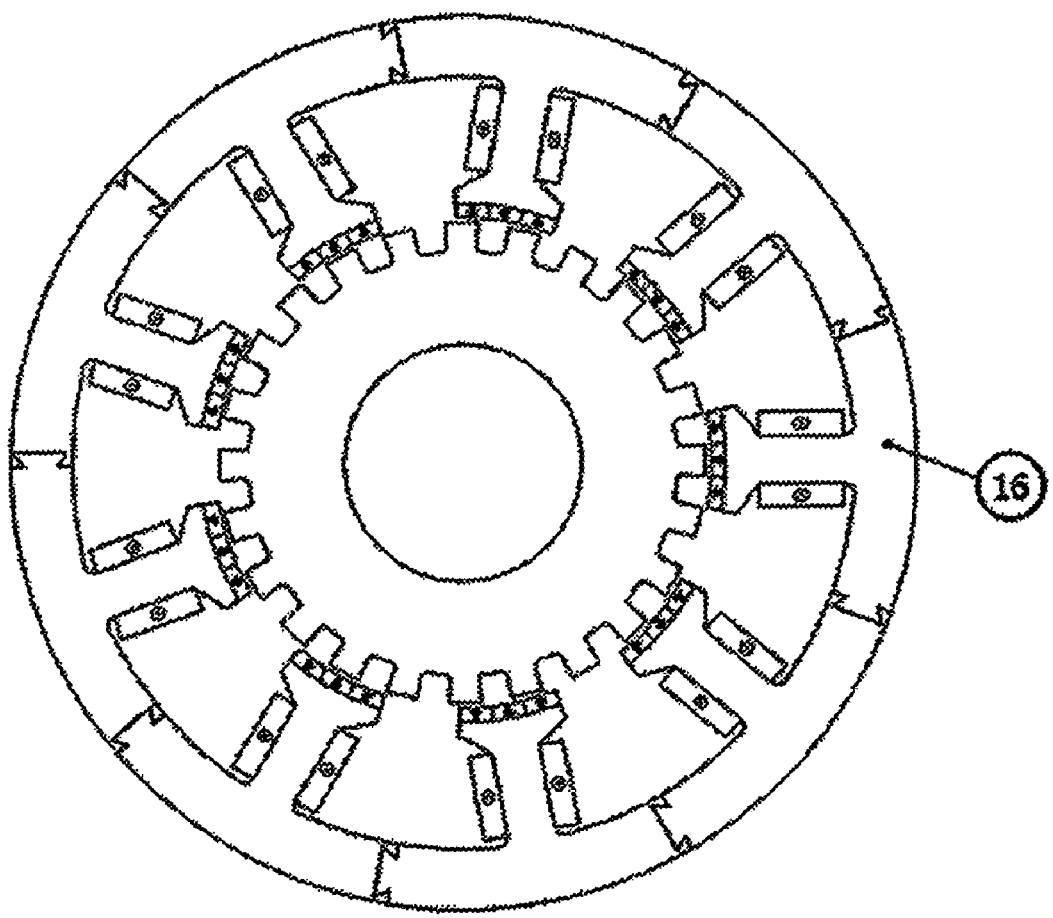
FIG. 17 is a view illustrating the case in which a nonuple-divided iron core is applied to the stator of the inner rotor type motor according to the embodiment of the present invention.
Figure 18:
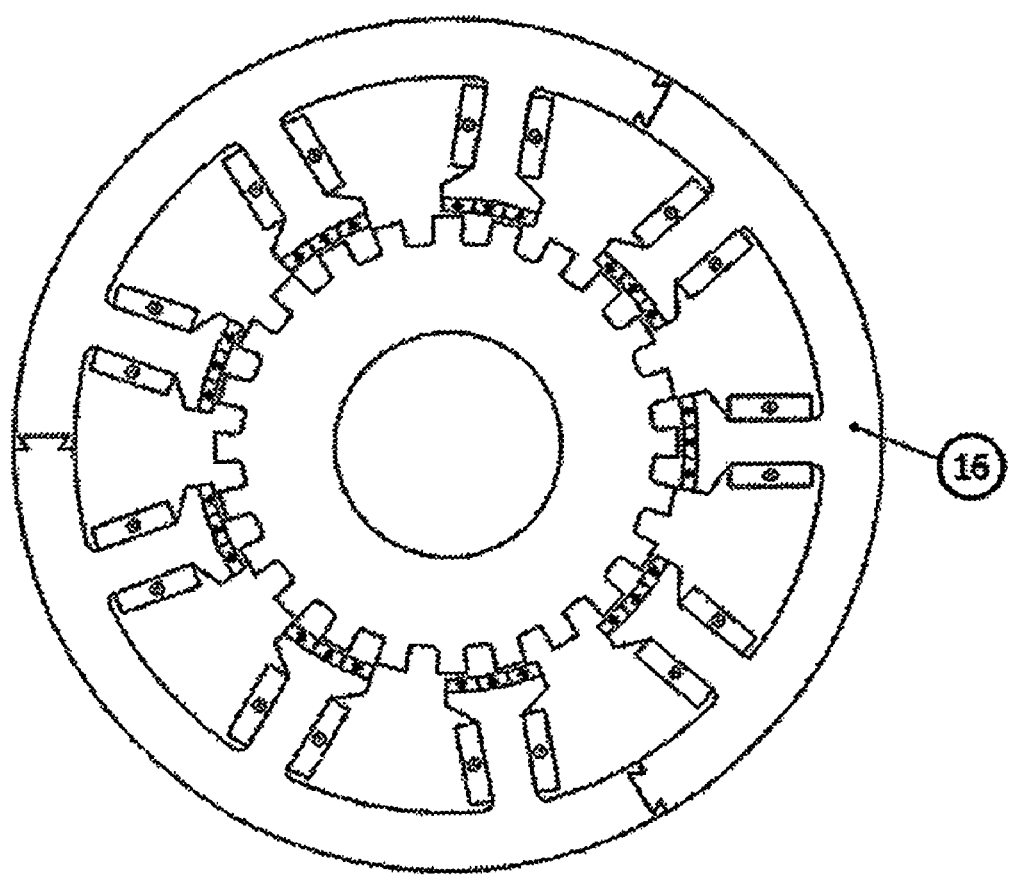
FIG. 18 is a view illustrating the case in which the triple-divided iron core is applied to the stator of the inner rotor type motor according to the embodiment of the present invention.

In the same manner, the stator of the inner rotor type motor, shown in FIG. 11, may be formed by coupling three or nine divided iron cores 16, shown in FIG. 17 or 18, to each other.

The above-described stator or rotor may be formed by coupling various numbers of iron cores, such as two, four, five or six divided iron cores, in addition to the three or nine divided iron cores.

Figure 19:
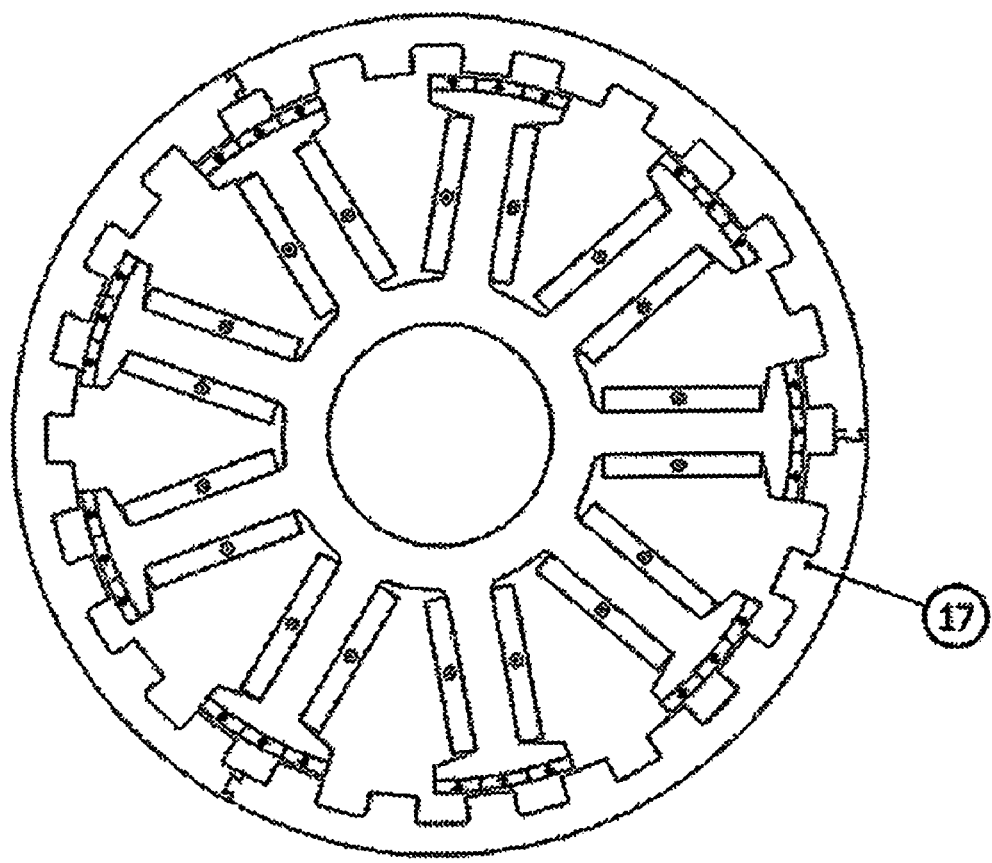
FIG. 19 is a view illustrating the case in which the triple-divided iron core is applied to the rotor of the outer rotor type motor according to the embodiment of the present invention.

Furthermore, the rotor of the outer rotor type motor, shown in FIG. 12, may be formed by coupling three divided iron cores, shown in FIG. 19, to each other. Each of the divided iron cores 17 of the rotor has a protrusion and a depression, and the protrusion of one divided iron core is coupled to the depression of another divided iron core, so that the divided iron cores can remain securely coupled to each other even when rotary motion is performed.

Figure 20:
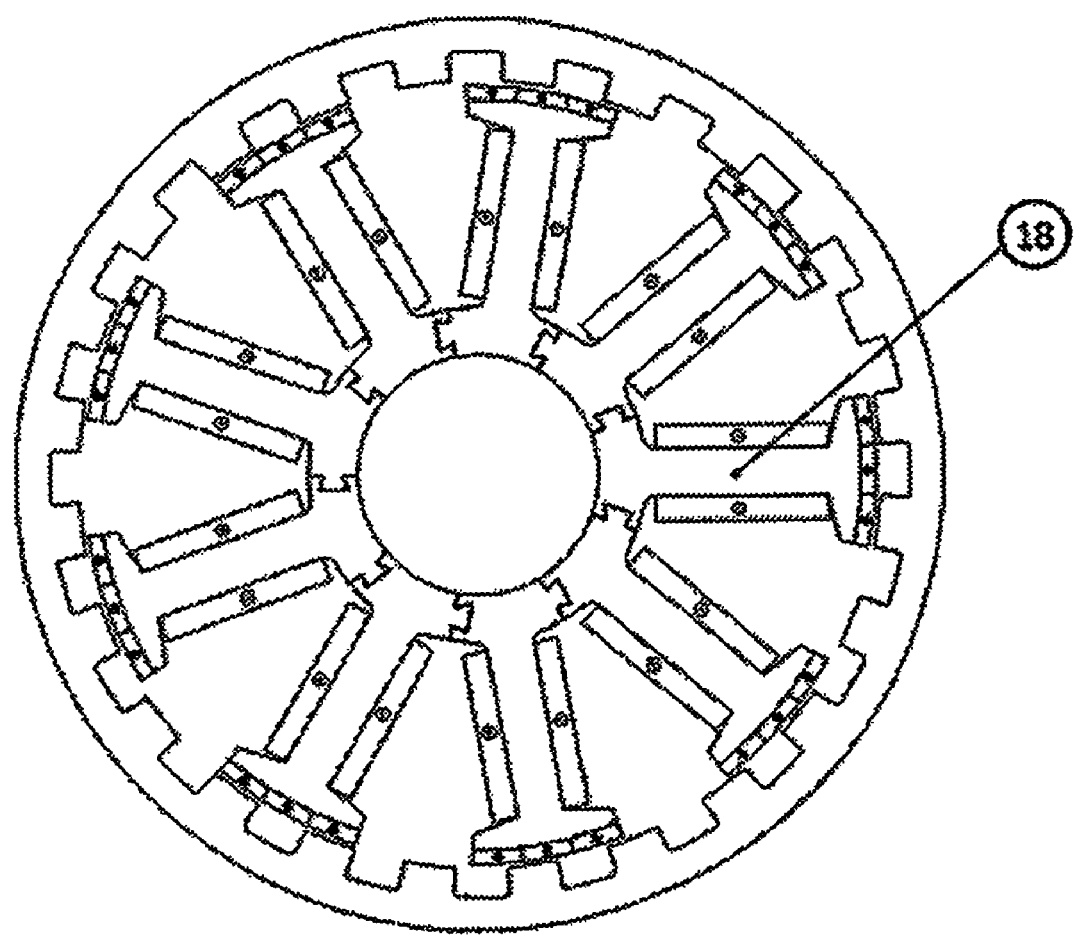
FIG. 20 is a view illustrating the case where the nonuple-divided iron core is applied to the stator of the outer rotor type motor according to the embodiment of the present invention.
Figure 21:
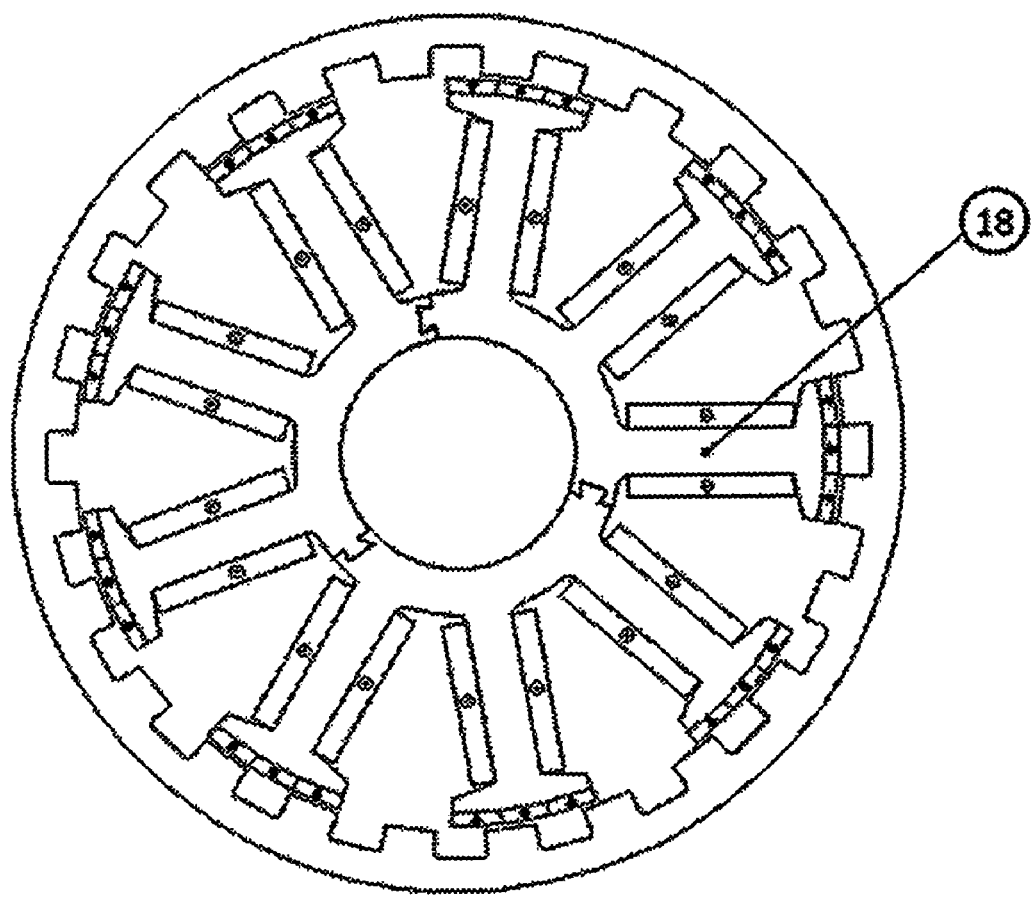
FIG. 21 is a view illustrating the case where the triple-divided iron core is applied to the stator of the outer rotor type motor according to the embodiment of the present invention.

In the same manner, the stator of the outer rotor type motor, shown in FIG. 12, may be formed by coupling three or nine divided iron cores 18, shown in FIG. 20 or 21, to each other.

The above-described stator or rotor may also be formed by coupling various numbers of divided iron cores, such as two, four, five or six divided iron cores, in addition to the three or nine divided iron cores.

When divided iron cores are applied to the stator or rotor as described above, the stator or rotor can be more easily manufactured than a stator or rotor that is formed as a single body. Furthermore, in the case where any abrasion occurs, only a portion of the stator or rotor need be replaced, without requiring replacement of the entire stator or rotor, thus conferring an economic advantage in use.

Figure 22:
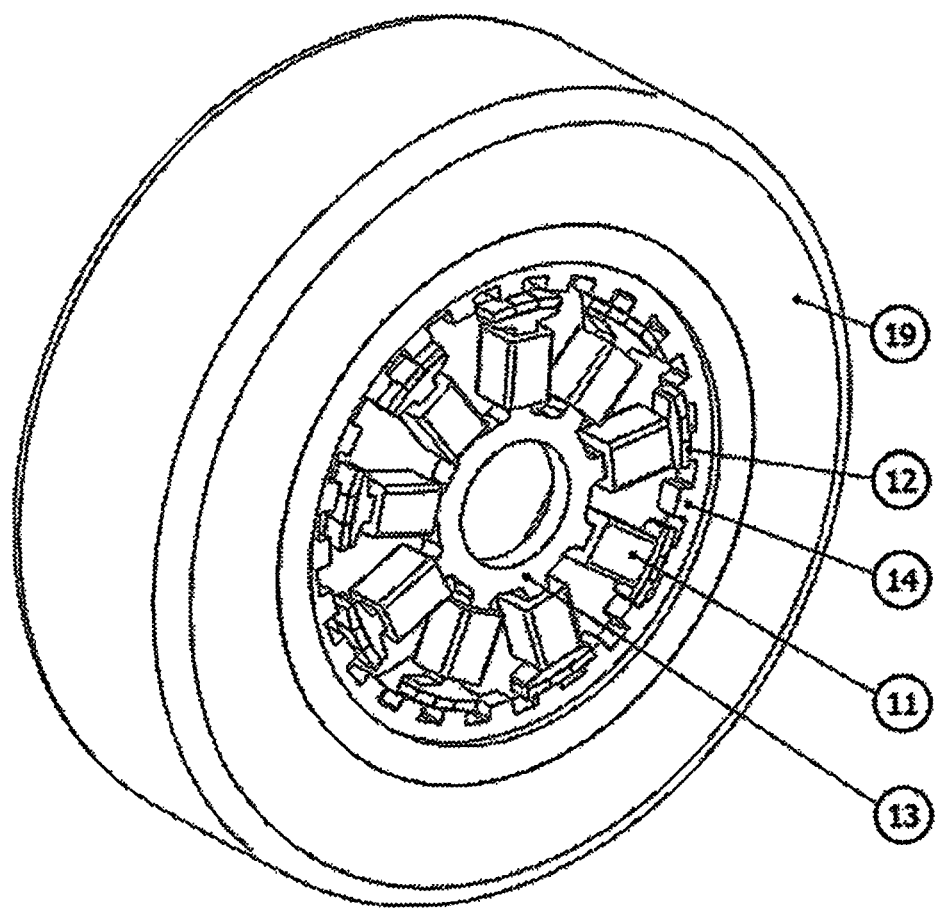
FIG. 22 is a view illustrating the case where the outer rotor type motor according to the embodiment of the present invention is mounted to a wheel of a vehicle.

FIG. 22 is a view illustrating the case where the outer rotor type motor of FIG. 12 according to the embodiment of the present invention is mounted in the wheel of a vehicle.

When the outer rotor type motor according to an embodiment of the present invention, which is implemented in various ways, is used to drive the wheel of a vehicle, the permanent magnets 12 are attached to the stator as described above, so that there is no concern about scattering of the permanent magnets. Here, the vehicle includes all of an automobile, an electric rail car, a train, and the like, which have drive equipment using wheels.

Figure 23:
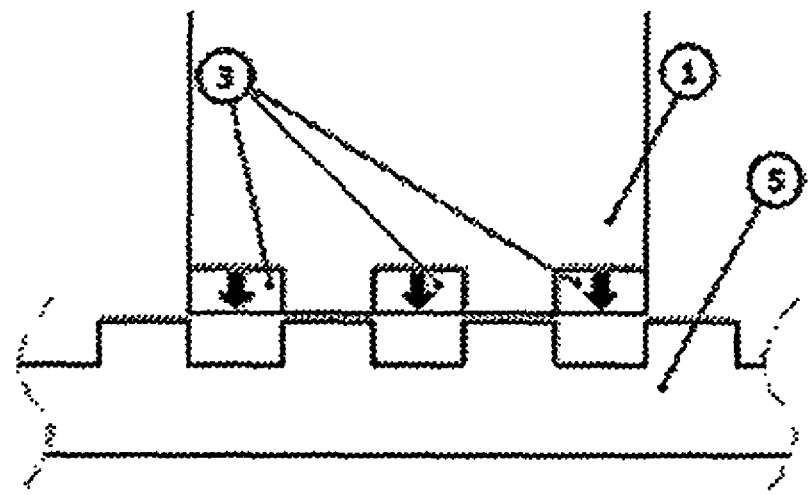
FIG. 23 is a view illustrating an embodiment of the present invention, in which permanent magnets are applied to mover teeth having an uneven surface structure.

FIG. 23 is a view illustrating an embodiment of the present invention, in which permanent magnets are applied to mover teeth having an uneven surface structure.

Referring to FIG. 23, the present embodiment may be configured such that two protrusions are formed in the end of each tooth of the mover core 1 of a mover, which moves relative to a stator core 5, and such that permanent magnets 3, having the same polarity, for example, either N or S polarity, are provided in the right and left ends of the end of the tooth and in a depression formed between the protrusions.

Figure 24:
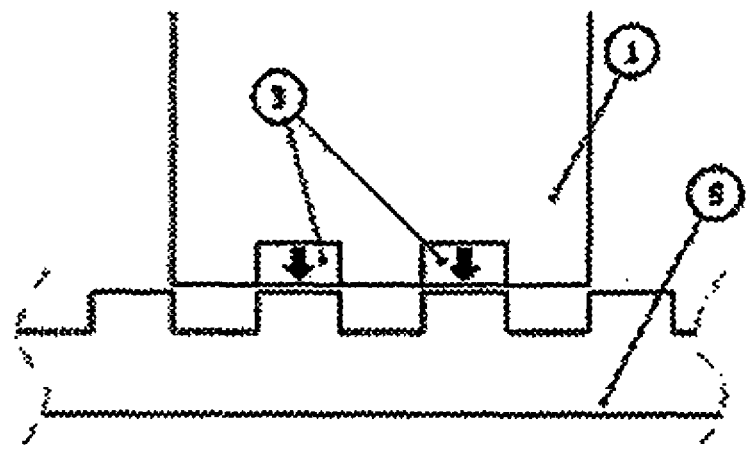
FIG. 24 is a view illustrating another embodiment of the present invention, in which permanent magnets are applied to mover teeth having an uneven surface structure.

FIG. 24 is a view illustrating another embodiment of the present invention, in which permanent magnets are applied to mover teeth having an uneven surface structure.

Referring to FIG. 24, the present embodiment may be configured such that three protrusions are formed in the end of each tooth of the mover core 1 of a mover, which moves relative to a stator core 5, and such that permanent magnets 3, having the same polarity, for example, either N or S polarity, are provided in depressions formed between the protrusions.

In addition to the embodiments, shown in FIGS. 23 and 24, another embodiment may be configured such that a plurality of protrusions is formed in the end of each tooth of a mover core 1, and such that respective permanent magnets 3, having the same polarity, for example, either N or S polarity, are provided on the right and left sides of each protrusion.

Figure 25:
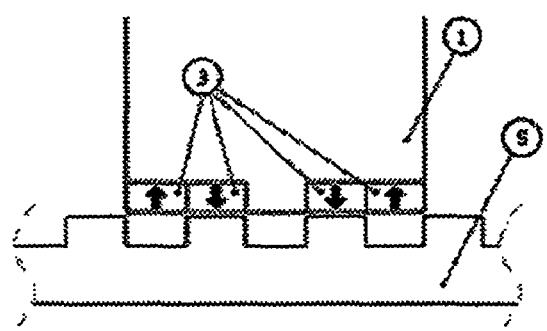
FIG. 25 is a view illustrating an embodiment of the present invention, in which two permanent magnets, the polarities of which are opposite each other, are arranged on the right and left sides of the central protrusion of a mover.

Furthermore, as shown in FIG. 25, two permanent magnets having opposite polarities may be provided on the right and left sides of the central protrusion of a mover. In greater detail, the present embodiment may be configured such that a single central protrusion is formed in the end of each tooth of the mover core 1 of the mover, which moves relative to a stator core 5, and such that permanent magnet pairs 3, that is, first permanent magnet and second magnet, having opposite polarities, are arranged on the right and left sides of the central protrusion. For example, the present embodiment may have a structure of N-S-protrusion-S-N or S-N-protrusion-N-S. In addition, in the protrusion structure of FIGS. 23 and 24 as well, permanent magnet pairs having opposite polarities may be provided on the right and left sides of each protrusion. Although two permanent magnet pairs have been described above as an example, three or more permanent magnet pairs may be arranged on the right and left sides of protrusions. For example, when the protrusion structure of FIG. 23 is applied, a structure of N-S-protrusion-S-N-protrusion-N-S or a structure of S-N-protrusion-N-S-protrusion-S-N may be implemented.

In the structures of the above-described flux reversal motors of FIGS. 23, 24 and 25 as well, the pulsation of the thrust and the attraction force can be reduced using the above-described skew.

Figure 26:
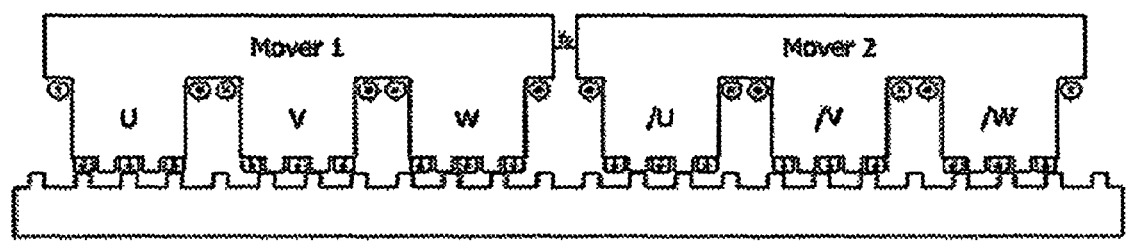
FIG. 26 is a view illustrating a flux reversal motor, to which two mover modules are applied, according to an embodiment of the present invention.

FIG. 26 is a view illustrating a flux reversal motor, to which two mover modules are applied, according to an embodiment of the present invention.

The flux reversal motor of FIG. 26 has a structure in which two three-phase movers, having three phase windings, are arranged. When a first mover 'Mover 1' and a second mover 2 'Mover 2' are arranged, the movers are spaced apart from each other by a pole pitch of $\tau_p$, and the phase windings, which are formed by coils wound around the mover teeth of the first and second movers 'Mover 1' and 'Mover 2' are wound in the opposite directions. Thanks to the above-described arrangement, an advantage of reducing the imbalance between the back-electromotive forces that are induced by the respective phase windings can be provided. Here, all of the above-described structures may be applied to the end of each tooth of a stator or a mover core. That is, a structure in which at least one protrusion is formed in the end of each tooth of a stator or a mover, and at least one permanent magnet is arranged on each of the right and left sides of the protrusion, or a structure in which at least one protrusion is formed in the end of each tooth of a stator or a mover, and a plurality of permanent magnets, having alternative polarities, are arranged on the right and left sides of the protrusion may be implemented.

Furthermore, the present invention is not limited to a structure in which three mover teeth are provided in each mover, but may include a structure in which a number of mover teeth, corresponding to a multiple of three, and phase windings, which are provided in the respective mover teeth, are provided in order to induce three-phase back-electromotive force. Furthermore, as shown in FIG. 26, the present invention is not limited to two mover modules, and may include all structures in which three or more mover modules are arranged to be spaced apart from each other by a pole pitch of $\tau_p$, and the phase windings of neighboring movers are wound in the opposite directions.

It will be appreciated by a person having ordinary knowledge in the art that the structures of the flux reversal motors shown in FIGS. 23 to 26 may be not only applied to linear motors, but may also be applied to the rotary motors shown in FIGS. 11 to 22 through a slight modification, so that the linear motors can be replaced with rotary motors.

As described above, in the flux reversal linear motor, the number of permanent magnets that are used can be decreased by enabling movable permanent magnets having the same polarities to be provided in the mover, thus reducing the manufacturing cost. Furthermore, the pulsation of the thrust and the pulsation of the normal force can be decreased by eliminating the end-effect, such as the generation of leakage magnetic flux, through appropriate arrangement of the above-described movable permanent magnets. In addition, the detent force can be decreased by appropriately applying the skew structure to the mover or stator core, thus ensuring low noise/low vibration, high speed, high precision, and high thrust motion.

Furthermore, in the flux reversal linear motor according to the present invention, an odd number of permanent magnets can be used at the location of the protrusion (A) of each mover tooth, and the permanent magnets can be arranged in the stator or in the mover. In addition, the mover teeth or the stator teeth can be modified and implemented in various ways to conform to requirements for various application systems.

Furthermore, in the rotary flux reversal motor according to the present invention, the degradation of the permanent magnets, attributable to the heat that is generated by the stator coils, can be prevented from occurring because the permanent magnets are provided in the rotor, or the scattering can be prevented from occurring because the permanent magnets are provided in the stator, and economical and easy manufacture can be realized by applying divided iron cores to the stator or rotor.

Furthermore, in the rotary flux reversal motor according to the present invention, the number of permanent magnets that are used can be reduced by selectively replacing portions to which the permanent magnets are attached with the iron core teeth. Furthermore, an odd number of three or more permanent magnets can be arranged in the rotor or in the stator, which are opposite each other relative to a plurality of protrusions. In addition, the rotor teeth or the stator teeth can be modified and implemented in various ways to conform to requirements for various applications.

Furthermore, the linear or rotary flux reversal motor according to the present invention can ensure the above-described low noise/low vibration, high speed, high precision, and high thrust motion, so that it can be used in various types of application equipment, such as a compressor, a processing machine and industrial electric equipment, in which linear or rotary motion is required, as well as in application fields such as a field in which low-speed direct drive or precision position control is required, or a field in which it is required to directly drive the wheels of vehicles, in which high-speed operation is required.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flux reversal motor, comprising:
   a mover moving relative to a stator; and
   a plurality of permanent magnets, having identical polarities, provided in ends of mover teeth or ends of stator teeth, the permanent magnets being arranged on left and right sides of at least one protrusion of an end of each mover tooth or each stator tooth such that the permanent magnets extend from a right side of the protrusion to a right edge of the mover tooth or the stator tooth and from a left side of the protrusion to a left edge of the mover tooth or the stator tooth, and
   wherein the permanent magnets are configured in such a way that, when other elements of the mover tooth are completed, predetermined magnets are attached to predetermined locations and are then magnetized to have identical polarities.

2. The flux reversal motor as set forth in claim 1, wherein the permanent magnets are configured to have any of triangular, rectangular, square, trapezoidal, pentagonal, and circular shapes.

3. The flux reversal motor as set forth in claim 2, wherein, when the permanent magnets are configured to have any of the triangular, rectangular, square, trapezoidal, and pentagonal, at least one edge of each of the permanent magnets is formed to have a round shape.

4. The flux reversal motor as set forth in claim 1, wherein an end of the protrusion is configured to have any of rectilinear, round, angled, and chamfered shapes.

5. The flux reversal motor as set forth in claim 1, wherein ends of teeth of the stator are configured to have any of rectilinear, round, angled, and chamfered shapes.

6. The flux reversal motor as set forth in claim 1, wherein iron cores of the stator or of the mover are laminated such that the stator teeth and the mover teeth are opposite each other so as to have a predetermined skew structure.

7. The flux reversal motor as set forth in claim 1, wherein the stator has a curved track for motion of the mover.

8. The flux reversal motor as set forth in claim 1, wherein the mover comprises mover teeth, a number of which is a multiple of three, which are arranged at an identical pitch in a motion direction.

9. The flux reversal motor as set forth in claim 8, wherein the ends of the mover teeth have a length three or any odd number of times as great as a pole pitch of each of the permanent magnets in the motion direction.

10. The flux reversal motor as set forth in claim 1,
wherein the mover moving linearly relative to the stator; and
an end of the stator is configured to have the permanent magnets being arranged at respective locations between teeth of the stator, which repeat in a motion direction.

11. The flux reversal motor as set forth in claim 10, wherein the mover has an uneven surface structure in which, in an end of each tooth thereof, two protrusions are formed in the end of each tooth and one depression is formed between the two protrusions.

12. The flux reversal motor as set forth in claim 10, wherein the mover has an uneven surface structure in which, in an end of each tooth thereof, three protrusions are formed in the end of each tooth and depressions are formed between the three two protrusions.

13. The flux reversal motor as set forth in claim 1,
wherein the mover is a rotor rotating internally or externally relative to the stator in a circumferential direction.

14. The flux reversal motor as set forth in claim 13, wherein the stator comprises stator teeth, a number of which is a multiple of three, which are arranged at an identical pitch in the circumferential direction.

15. The flux reversal motor as set forth in claim 13, wherein the stator or rotor has a laminated iron core, the laminated iron core being formed by coupling two or more divided iron cores to each other.

16. The flux reversal motor as set forth in claim 13, wherein the flux reversal motor is used to drive a wheel of a vehicle.

17. The flux reversal motor as set forth in claim 1,
wherein the mover is a rotor rotating internally or externally relative to the stator in a circumferential direction, and an end of the mover is configured to have the permanent magnets being arranged at respective locations between teeth of the stator, which repeat in a motion direction.

18. The flux reversal motor as set forth in claim 1,
wherein the permanent magnets include one or more permanent magnet pairs, that is, first permanent magnet and second permanent magnet, having opposite polarities.

19. A flux reversal motor, comprising:
a stator;
two or more movers moving relative to the stator, provided with phase windings, which are formed by coils which are wound around mover teeth, a number of which is a multiple of three, and arranged to be spaced apart from each other by a predetermined pole pitch, wherein phase windings of neighboring movers are wound in opposite directions; and
a plurality of permanent magnets, provided in an end of each tooth of a stator or in an end of each tooth of each of the movers,
wherein the permanent magnets include at least one permanent magnet, or permanent magnets having opposite polarities, on right and left sides of at least one protrusion such that the permanent magnets extend from a right side of the protrusion to a right edge of the mover tooth or the stator tooth and from a left side of the protrusion to a left edge of the mover tooth or the stator tooth.

* * * * *